Dec. 23, 1941.  F. B. LEE  2,267,700
SCORING APPARATUS
Filed Sept. 18, 1940  3 Sheets-Sheet 1
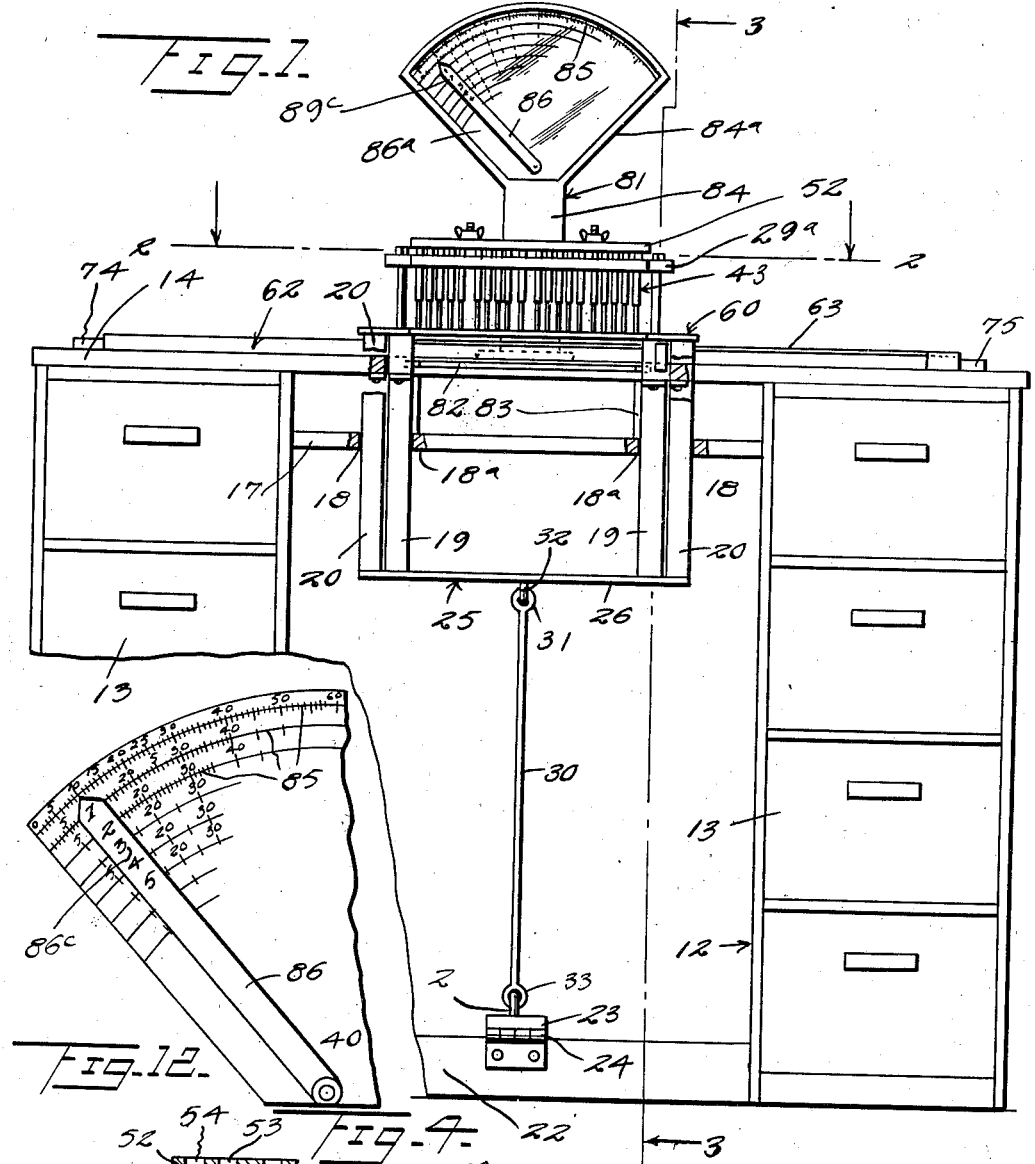
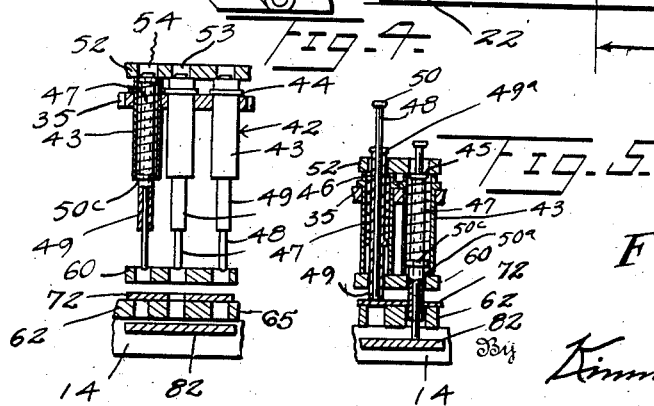
Inventor
Floyd B. Lee
By Kimmel & Crowell
Attorneys Dec. 23, 1941.  F. B. LEE  2,267,700
SCORING APPARATUS
Filed Sept. 18, 1940  3 Sheets-Sheet 2
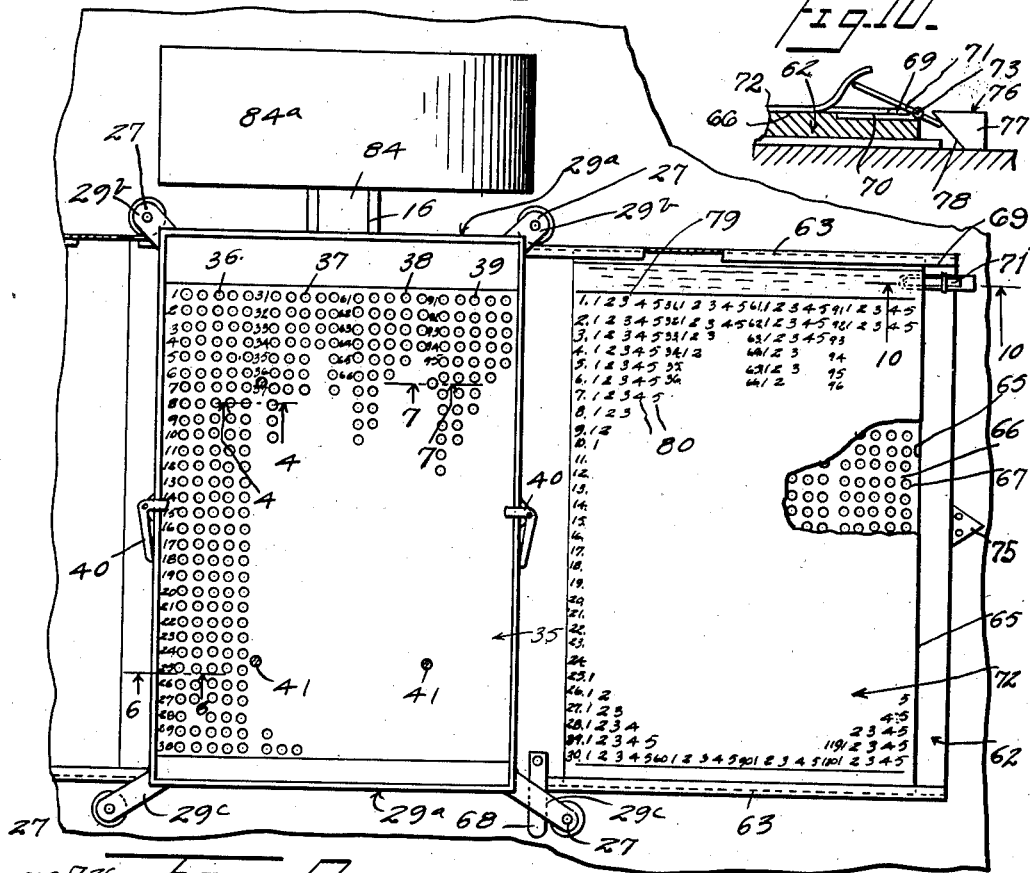
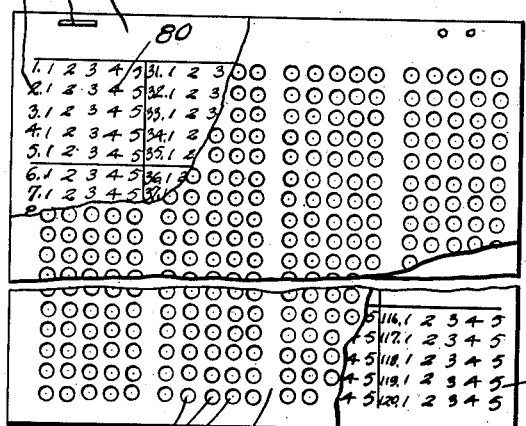
Inventor
Floyd B. Lee
By Kimmel & Crowell
Attorneys Dec. 23, 1941.  F. B. LEE  2,267,700
SCORING APPARATUS
Filed Sept. 18, 1940   3 Sheets-Sheet 3
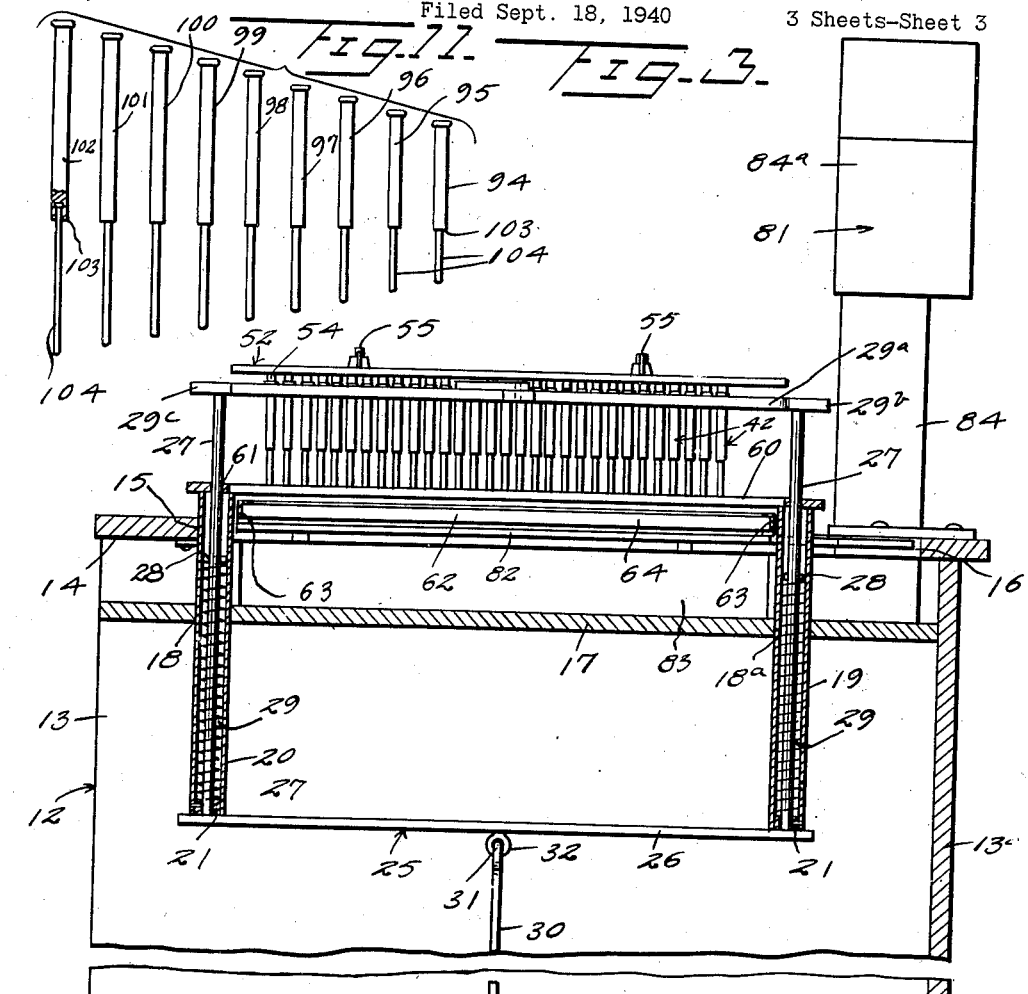
Inventor
Floyd B. Lee
By Kimmel & Crowell
Attorneys Patented Dec. 23, 1941

2,267,700

UNITED STATES PATENT OFFICE 2,267,700

SCORING APPARATUS

Floyd B. Lee, St. Louis, Mo.

Application September 18, 1940, Serial No. 357,309

22 Claims. (Cl. 35—48)

This invention relates to a scoring apparatus designed primarily for use by educational institutions, but it is to be understood that an apparatus, in accordance with this invention, is for employment in any connection for which it may be found applicable.

This invention is an improvement upon the scoring apparatus disclosed by Letters Patent, No. 2,067,769, granted to me January 12, 1937.

In the apparatus as disclosed by the patent aforesaid students check sheets are employed formed with columns of rows of digits, each digit identifying an answer to a question offered at an examination, certain of these digits are punched out by the student to identify what will be the student's answers to the questions propounded to him. The check sheet is then positioned in the apparatus and the latter operated to determine the number and to register the aggregate value score of correct answers made by the student to the questions offered. The apparatus has as parts thereof vertically movable controlling elements for passage through the punched openings in the check sheet to operate a computing mechanism to register the score made by the student whose check sheet has been inserted in the apparatus. It has been found that edges of some of the punched openings in the check sheet are ragged, due to irregular or imperfect punching by the student and retard the passage of the controlling elements correlated with such openings which results in the computing mechanism setting forth an incorrect or imperfect score. The apparatus, in accordance with this invention not only embodies the objects and advantages of the apparatus disclosed by the patent aforesaid, but further aims to overcome the objection referred to by including means to prevent the controlling elements contacting with the edges of all of the punched openings in the check sheet on the passage of the said elements to operate the computing mechanism to thereby provide the latter at all times setting forth a correct score.

The invention further aims to provide, in a manner as hereinafter set forth, an apparatus including a stripper means for the student's check sheet after the score has been ascertained.

The invention further aims to provide an apparatus for the purpose referred to including a computing mechanism having as a part thereof a balance disposed below and in the path of the controlling elements aforesaid and with said mechanism further including a score indicating or registering means arranged above said elements and permanently visible to the operator at all times.

The invention further aims to provide an apparatus for the purpose referred to including a vertically movable master plate formed with openings for selectively receiving a combined pilot and controlling element assembly for correlation with said computing mechanism.

A further object of the invention is to provide an apparatus for the purpose referred to including a lock plate for correlation with the master plate for releasably securing the assemblies aforesaid in selected positions in the master plate.

A further object of the invention is to provide an apparatus for the purpose referred to having as an element thereof a removable retainer for maintaining the assemblies aforesaid in the master plate when the latter is removed from the machine, stored and transported with the assemblies therein from point to point.

A further object of the invention is to provide a machine of the class referred to with a vertically movable spring controlled carrier common to the master plate, the locking plate, the assemblies and the stripper means heretofore referred to.

A further object of the invention is to provide an apparatus for the purpose referred to including a slide for successively positioning student's check sheets in the path of the controlling elements aforesaid and with means correlating with and for lifting a portion of the student's check sheet from the slide to permit of the convenient removal of the sheet after it has been shifted from below the controlling elements.

A further object of the invention is to provide a machine of the class referred to with a series of combined pilot and controlling element assemblies capable of being selectively suspended from the master plate and each including as parts thereof a controlling element for correlation with the computing mechanism and a spring controlled pilot for correlation with a punched opening in a check sheet and in which pilot is slidably arranged a controlling element.

The invention further aims to provide, in a manner as hereinafter set forth, a scoring apparatus consisting of the novel construction, combination and arrangement of parts as will be hereinafter more specifically described and illustrated in the accompanying drawings, wherein is shown an embodiment of the invention, but it is to be understood that changes, variations and modifications may be resorted to which fall within the scope of the invention as claimed.

In the drawings:

Figure 1 is a fragmentary view in front elevation of a scoring apparatus in accordance with this invention, Figure 2 is a section on line 2—2 Figure 1 with the computing mechanism shown in top plan, Figure 3 is a section on line 3—3 Figure 1 broken away, Figure 4 is a fragmentary view partly in elevation and partly in vertical section illustrating a plurality of the combined pilot and controlling element assemblies in normal position, Figure 5 is a fragmentary view in vertical section illustrating a plurality of combined pilot and controlling element assemblies when shifted from normal position, Figure 6 is a fragmentary view in transverse section of the master plate and its supporting frame, Figure 7 is a fragmentary view partly in section and elevation of the locking plate, master plate and supporting frame for the master plate, Figure 8 is a top plan view, broken away of the retaining element which is to correlate with the master plate for retaining the combined pilot and controlling element assemblies in the master plate when the latter is stored, Figure 9 is a top plan view broken away of the student's check sheet and its carrier, Figure 10 is a fragmentary view partly in elevation and partly in section illustrating the lifting means, for a portion of the check sheet and the carrier for the latter, in operated position, Figure 11 is an elevation of a set of modified form of controlling elements of different weights, Figure 12 is a fragmentary view in front elevation of the score indicating or registering means, and Figure 13 is a fragmentary view in longitudinal section, and upon an enlarged scale of the slide for holding punched student's check sheets in position to be scored.

The apparatus includes a supporting structure 12 shown by way of example as a desk formed of a pair of spaced parallel tiers 13 of drawers having mounted thereon and secured thereto the desk top 14 which is flat and of rectangular contour. The top 14 is formed with a rectangular opening 15 and a cutout 16 arranged centrally with respect to the rear wall of opening 15. The cutout at its front end communicates with the rear of said opening 15. Arranged between and secured to the tiers 13 is a supporting member 17 disposed below the opening 15 and in close proximity to the top 14. The member 17 is formed with a pair of spaced parallel openings 18 and a pair of spaced parallel openings 18ª. There is secured to the top 14 a pair of spaced parallel rear vertical stationary guide tubes 19 and a pair of spaced parallel front vertical stationary guide tubes 20, which are disposed in lateral relation with respect to the tubes 19. The said tubes extend through the top 14 and are secured between their transverse medians and upper ends to said top 14, as by way of example as shown with respect to one of the tubes 20, Figure 3. The major portion of the length of said tubes depends from top 14. The tubes 19, 20 furthermore constitute stops for limiting the extent of the upward movement of a vertically movable flat base to be referred to. The tubes 20 are arranged relative to said base whereby they will be capable of abutting the upper face of the base at the front of the latter in close proximity to its side edges. The tubes 19 are arranged relative to said base whereby they will be capable of abutting the rear of the upper face of the base at points spaced inwardly from the side edges of the base. The tubes 19 are offset inwardly with respect to the tubes 20. The lower end of each tube has secured therein an internal ring 21 which provides a combined guide and abutment in a manner to be referred to. The said tubes 20, 19 extend down through the openings 18, 18ª respectively in the support 17. The openings 18 are disposed a greater distance apart than the openings 18ª to provide for the arrangement referred to of the tubes 19, 20. Between the tiers 13 and against the back 13ª of the desk 12 is arranged a base board 22 to which a foot pedal 23 is hinged, as at 24.

The apparatus includes a vertically shiftable spring controlled carriage 25 formed with a flat base 26 having fixed thereto the lower ends of front and rear vertically extending pull rods 27 which pass upwardly through and project from the upper ends of the tubes 19, 20. The rods 27 pass through the rings 21 and these latter form guides for the rods. Fixed to and disposed diametrically of each rod 27 intermediate the ends of the latter is a pin 28. Surrounding each rod 27 and interposed between a ring 21 and a pin 28 is a coiled controlling spring 29 for the rod. The rings 21 form abutments for the lower ends of the springs. The pins 28 constitute compressors for the springs. Fixedly secured to the upper ends of the rods 27 is a rectangular supporting frame 29ª for a master plate to be referred to. The frame 29ª at its rear corners is formed with outwardly directed inclined apertured arms 29ᵇ having their outer ends aligned with the upper ends of the tubes 19. The frame 29ª at its front corners is formed with outwardly directed inclined apertured arms 29ᶜ of greater length than the arms 29ᵇ and having their outer ends aligned with the upper ends of the tubes 20. The apertures in the arms 29ᵇ and 29ᶜ are in the outer ends of said arms and are disposed coaxially with the axes of the tubes 19, 20 respectively. The upper terminal portions of the rods 27 extend into the apertures of and are fixedly secured to said arms. The rear arms are oppositely disposed. The front arms are oppositely disposed.

The carriage 25 is pulled downwardly against the action of the springs 29 by a pull member 30 in correlation with the foot pedal 23. The upper end of the pull member 30 carries an eye 31 which is connected to an eye 32 depending from the lower face of the base 26 of the carriage 25. The lower end of the pull member 30 is provided with an eye 33, which is connected to an eye 34 carried by the pedal 23.

The master plate, indicated at 35 is of rectangular contour and provided with columns 36, 37, 38, 39 of parallel spaced rows of five spaced openings. The rows of one of the columns endwise align with the rows of the other columns. Preferably the number of rows of each column will be thirty. The plate 35, when used is for seating in the frame 29ª, and when so arranged it is detachably secured in position by the shiftable retainer devices 40 secured to the sides of frame 29ª. The openings in the rows of the columns of the master plate are for selectively receiving a combined pilot and controlling element assembly to be referred to. The said assemblies which are mounted in the selected openings of the master plate are disposed in depending relation with respect to such plate. The columns aforesaid will be disposed in spaced relation with respect to each other and formed in the plate 35 between certain of said columns are four spaced tapered openings 41 for a purpose to be referred to.

The combined pilot and controlling element assemblies are generally indicated at 42 and are of like form. Each assembly, with reference to Figure 4, includes a combined carrier and guide in the form of a vertical cylinder 43 provided in proximity to its upper end with a peripheral collar 44 which provides a suspension for the assembly when the latter is mounted in the master plate 35.

The cylinder 43 includes an upper head 45 formed with an axial opening 46. The head 45 constitutes an abutment for a coiled spring 47 arranged within the cylinder 43. Mounted for slidable relation with respect to the cylinder 43 is a vertically disposed headed controlling element 48 for operating a computing mechanism. The elements 48 are of uniform weight. Each element 48 extends down through the head 45 of cylinder 43 to below the latter. Extending down through the head 45 of cylinder 43 to below the latter is a tubular pilot, plunger or pointer 49. The latter encompasses the element 48 and is formed with a flared upper end 49a in which the head 50 of element 48 normally seats and is suspended from. The pilot 49 is of less length than element 48, normally projects from the lower open end 50a of the cylinder 43 and has correlated therewith the controlling spring 47. The latter encompasses the pilot 49 and is interposed between head 45 and a disc 50c fixed to pilot 49 intermediate the ends of the latter. The disc 50c is normally positioned in the open lower end of the cylinder 43. The element 48 is of a length to depend below and it is also vertically slidable relative to pilot 49. The elements 48 are in the form of headed nails. The pilot 49 is in the form of a tube of a diameter to pass through a punched opening in a student's check sheet to be referred to.

The assemblies 42 are arranged relative to selected openings of the rows of openings in the master plate 35 in the manner as shown in Figures 4 and 5, and when so arranged are detachably secured in such position by a locking plate 52 disposed in superimposed relation with respect to the upper ends of the cylinders 43 of the assemblies. The plate 52 corresponds in contour to the plate 35 and is formed with openings 53 of the same number and aligning with the openings of the rows of openings in the master plate. The openings 53 provide to lock the pilots in position in the master plate and for the upward passage of the elements 48 when the latter are arrested in their downward movement by the student's check sheet and which will be more fully referred to. An element 48, when its movement is arrested by the student's check sheet, will be in the position as shown to the left of Figure 5. An element 48 when acting to operate the computing mechanism to be referred to will also be raised with respect to the locking plate and its position will be as shown to the right of Figure 5, but its upward movement will be of less extent than when the element is not active. The plate 52 is also formed with a set of openings 54 which align with the openings 41 in the master plate 35. When the plate 52 is disposed in superimposed relation to the cylinders 43 of the assemblies 42 it is detachably secured to the master plate 35 by securing devices 55 of like form corresponding in number to the number of openings 54. Each of the securing devices 55, with reference to Figure 7, comprises a bolt 56 formed of a reduced portion 57 and a threaded shank 58. The portion 57 is upset in an opening 41 to form the bolt with what may be termed a tapered head completely filling the opening 41 as is shown by Figure 7. The shank 48 extends upwardly through an opening 54 and carries a wing nut 59. The nuts 59 correlate with the shanks 58 and plate 52 for detachably clamping plates 35, 52 together to arrest the upward movement of the cylinders of the assemblies 42.

The apparatus includes a stripper plate or element 60 for stripping off of the student's check sheet to be referred to. The plate 60 is of rectangular contour and is seated on the upper ends of the tubes 19 and 20 and provided with openings 61 for the passage of the rods 27 of the carriage 25. The plate 60 is arranged below and in the path of the assemblies 42. The manner in which the plate 60 functions will be referred to. The plate 60 is to be arranged above the student's check sheet and its carrier to be referred to.

The apparatus includes a reciprocatory slide 62 for the purpose of arranging a student's check sheet and its carrier in the downward path of the assemblies 42. The slide 62 is positioned directly below the stripper plate 60 and is slidably mounted in a pair of oppositely disposed spaced parallel channel-shaped inwardly opening guides 63 fixed to the desk top 14 between the tubes 19, 20. The slide 62 consists of a rectangular body 64 formed in its upper face with a pair of spaced pockets 65 each for receiving and corresponding in outline to a student's check sheet. Only one of the pockets 65 is shown. The pockets 65 are of like form. The base 66 of each pocket 65 is formed with spaced columns of parallel rows of openings corresponding in form and arrangement to the columns of parallel rows of openings in the master plate 35. The columns of the parallel rows of openings in the base 66 of one of the pockets 65 are generally indicated at 67 (Figure 2). The slide 62 centrally of one side thereof and between the pockets 65 has extended therefrom a handle member 68. The upper face of the slide 62 at each end and in proximity to one side of said slide is formed with a groove 69, only one shown (Figure 10). The base 66 of each pocket is provided with a short depression 70 forming a flush inward continuation of the lower portion of the groove 69. The latter opens at an end edge of the slide. Pivotally connected to the slide are a pair of short oppositely disposed lever-like lifters 71, only one shown, each for raising a portion of a student's check sheet 72 to facilitate its removal from a pocket 65. Each lifter 71 has its major portion normally disposed horizontally within a groove 69 and in the inward continuation of the latter. Each lifter 71 is pivotally connected between its transverse median and its outer end to the slide, as at 73. Each lifter 71 extends outwardly from an end of a slide. The manner in which a lifter is operated to elevate a portion of a sheet 72 will be clear from what follows.

The guides 63 are arranged between and abut the inner sides of and extend horizontally in opposite directions from the tubes 19. The guides 63 are of greater length than the slide for the purpose of guiding the slide to the full extent of its shaft in either direction of its movement. The movement in opposite directions of the slide is arrested by a pair of spaced parallel aligned stops 74, 75 fixed upon the desk top 14. The stops 74, 75 are so disposed relative to the slide and guides 63 that when stop 74 is engaged by the slide on the shifting of the latter in one direction the sheet 72 in the pocket 65 in the left portion of the slide will be disposed in the path of the controlling elements 47, and when the stop 75 is engaged by the slide on the shifting of the latter in the opposite direction, the sheet 72 in the pocket 65 in the right portion of the slide will be disposed in the path of the controlling elements 47. The guides 63 always confine the slide in the same path, that is to say they act as means to prevent the shifting of the slide from the path in which it is to be required to travel when positioning the check sheet 72 relative to the controlling elements.

There is correlated with the lifters 71 a pair of oppositely disposed operating members 76 therefor, only one shown. The said members 76 are fixed to the desk top 14 and sidewise align in spaced relation with the stops 74, 75. The inner ends of the members 76 are offset with respect to the inner ends of the stops 74, 75. The members 76 are of like form each consisting of a block 77 having its end 78 beveled and with the bevel arranged at an upward inward inclination from the bottom to the top of the block. The members 76 are of greater height than the height of the ends of the slide. When the slide moves in a direction to a position to engage one of the stops 74 or 75, that portion of the lifter which extends from an end of the slide engages the beveled inner end of a member 76 whereby the inner portion of the lifter will be elevated resulting in the raising of a portion of the sheet 72 (Figure 10).

The student's check sheet 72, or what may be termed an indicator element, includes on one face thereof consecutively numbered spaced rows 79 of five spaced distinctive digits one to five, as indicated at 80. The rows 79 are arranged in four spaced parallel columns. The rows of digits of one column endwise align with the rows of the digits of the adjacent columns. The digits of the endwise aligned rows are consecutively numbered from the first digits of the first column to the last digits of the last column. The sheet 72 is formed of a rectangular paper web. There is correlated with the sheet 72 a carrier 72$^a$ providing what may be termed a punch guide when the student is punching his check sheet. The carrier 72$^a$ corresponds in size to the sheet 72 and it is formed from a sheet of cardboard of greater thickness than the web. The carrier 72$^a$ is formed with openings 72$^b$ corresponding in number to the aggregate number of all of the digits of said rows. Each opening 72$^b$ is arranged below and in concentric relation with respect to a digit 80. The sheet 72 is detachably secured at one end to the carrier 72$^a$ by the connecting means 72$^c$ in a manner to position the digits in alignment with the openings 72$^b$. The openings 72$^b$ in the carrier 72$^a$ permit of the passage of a punch when a student is punching the sheet 72.

The apparatus includes a computing mechanism 81 which functions to register the number of scores or in other words the aggregated number of correct answers, designated or indicated by a student on his sheet 72 to objective test questions. The mechanism 81 includes a balanced vertically movable platform 82 elevated above a base 83, a hollow standard 84 extending upwardly from the rear end of the base 83 and terminating in a hollow head 84$^a$ having arranged therein a scale 85 and a pointer 86 formed with a row of consecutive numbers. The head is open at its front and extending across said front is a transparent panel 86$^a$. The pointer 86 is connected with and operated from the platform 82. The mechanism 81 is of a construction corresponding to a form of weighing scales now in general use. The base 83 of mechanism 81 is mounted on the support 17, the platform 82 of such mechanism arranged directly below the slide 62 and between the tubes 19, 20 and the standard 84 is disposed in the cutout 18 of the desk top 14. The standard 84 is of a length to extend above the carrier 25 when the latter is in normal position to thereby always position the desk 85 and the pointer 86 permanently visible to the operator from the front of the apparatus. The pointer 86 will have its outer face provided with a row of spaced consecutive numerals. The row may consist of a desired number of numerals preferably forty, but the numerals may be more or less than forty. By way of example, but five numerals are shown on the pointer, from one to five and indicated at 86$^c$. The scale 85 is in the form of spaced concentrically arranged arcuate rows 85$^a$ of weight indicating graduations or other suitable indicia such as derived scores. A number 86$^c$ correlates with a row 85$^a$. The numbers 86$^c$ constitute guides for reading the graduations of the rows 85$^a$. The weight indicating graduations of the aforesaid type of scale are employed for the purpose to set forth the aggregated number of correct answer as indicated by the student on his check sheet.

The center of each digit of each row of digits on the check sheet 72, when the latter is positioned in the apparatus aligns with the axes of openings in the slide, the stripper and the master plate which align with each other.

The apparatus includes a retainer element 91 for releasably retaining the assemblies 42 in the master plate 35, when the latter is removed from the apparatus and stored or when the plate 35 is transported from place to place. When the element 91 is employed the locking plate 52 is removed from the master plate and the element 91 disposed in superimposed relation with respect to the heads of the controlling elements 47. The retainer elements 91 consists of a rectangular body 92 corresponding in form and dimensions to the master plate. The element 91 is formed with spaced openings 93 adapted, when element 91 is used to align with the openings 41 in the master plate, and the securing devices 55 are correlated with the aligned openings 41, 93 for detachably clamping the master plate and element 91 together.

The operation of the apparatus will now be referred to. Assemblies 42 will be mounted in selected openings of and depend from the master plate. The locking plate 52, for the positioned assemblies 42, is then secured to the master plate in superimposed relation with respect to the cylinders of assemblies 42, but it is so arranged that the controlling element of the assemblies may pass upward through openings in plate 52, as is shown by Figure 5. The master plate after being secured to the plate 52 is mounted in the frame 29$^a$ to position said plate 35 in the carriage 25. When the assemblies 42 are arranged in the master plate the pilots 48 will depend from the cylinders 43 and the elements 47 depend from the pilots 48 as is shown by Figure 4. The assemblies 42 are arranged in the selected openings in the master plate at points to indicate correct answers to the objective test questions. A punched student's check sheet removed from its carrier is mounted in each pocket 65 of the slide 62; each of these sheets having been punched by a different student. The slide is of a capacity for two sheets, as when one is scored, it is removed and another sheet substituted therefor, while that sheet remaining in the slide is being scored. This facilitates the scoring operation. The stripper plate 60 is permanently positioned as shown in Figure 3. The slide 62 is shifted to arrange a check sheet 72 to have the digits thereon align with the openings in the stripper and master plates. The carriage 25 is then lowered by depressing the foot pedal 23, which moves the carriage 25 downward carrying the master plate, locking plate and assemblies therewith. As the carriage moves downward, the pilots 49 and the controlling elements 47 will also move downward and pass through the openings in the stripper plate 60. On the downward movement of the pilots and controlling elements, they respectively will pass into and through the corrected punched openings in a check sheet, and the controlling elements which have passed through the said openings in the check sheet will abut and, due to their weight, depress the platform 82 to thereby operate the mechanism 81 to provide for the latter to visibly designate the student's score. If a pilot and the controlling element correlated therewith do not respectively pass into and through an opening in the check sheet, they will assume the position shown in Figure 5 while a controlling element which correlates with another pilot is operating the computing mechanism. The pilots which enter the punched openings in the check sheet act to prevent the edges of such openings to retard the downward movement of the controlling elements with which such pilots are correlated. When pressure is relieved on the foot pedal 23 the carriage, the master plate, the locking plate and the assemblies 42 carried by the locking plate are returned in an upward direction by the springs 29 to the position shown by Figure 3. On the upward movement of the elements just referred to, if the check sheet should adhere to any one or two or more of the pilots 49 and control elements 48 and is moved upwardly by the latter, the check sheet would come in contact with the stripper and disconnected from said pilots and control elements. After the master plate has been returned to its normal position, the slide is shifted to position the check sheet which has been tested to determine the score of the student clear of the carriage 25 and such check sheet removed from the slide. The latter is then shifted to arrange the other check sheet therein in a position to be tested and the foregoing operation is repeated on the second check sheet. After the first sheet has been tested or scored and the second sheet moved to a position for testing or scoring, the first sheet is removed and a non-tested or non-scored sheet is arranged in the pocket from which the first sheet was removed. This operation is had also with respect to the second sheet in the carrier after such sheet has been tested or scored.

When the value of one question is two to nine times of as much value in a quiz as another, all of the controlling elements employed for scoring will not correspond to the controlling elements 48, but there will be substituted for those of the controlling elements 48, not to be employed, what are termed weighted controlling elements as shown by Figure 11, or in other words, when the value of one question is two to nine times of as much value in a quiz as another, the weighted controlling elements are dropped into the pilots instead of the elements 48 as these latter correspond in weight.

With reference to Figure 11 the number of the set of weighted controlling elements is nine and such elements are indicated at 94, 95, 96, 97, 98, 99, 100, 101, 102 and each consists of a shank portion 103 and a weighting portion 104. The shanks of the weighted controlling elements 94 are of different lengths. The weighting portions of the controlling elements progressively increase in length from element 94 to element 102. The elements 94, 95, 96, 97, 98, 99, 100, 101, by way of example, will be respectively double the weight, three times the weight, four times the weight, five times the weight, six times the weight, seven times the weight, eight times the weight and nine times the weight of a controlling element 47. When all of the questions of a quiz are of single low value, only the controlling elements 48, which are of like weight, will be dropped into the pilots.

While it is foregoing indicated that the weighted measures should run from 2 to 9, it should be understood that this is meant also to comprehend the use of weighted measures that would run from 1 to 9 in units and might also include weights between the units, as for example a value of 5½ or 6½, etc. Moreover, weighted measures may be used beyond 9 units as well as weights which are only a fraction of a unit, as for example, ½ or ¾.

It will be noted that use of spring scales is indicated and referred to herein, but it is not intended to limit the application in this respect as balanced scales of the computing type may also be used, if desired.

Likewise, in respect to the check sheets, these may vary. For example, the sheet may have five numerals on the line and one hundred and twenty lines, or ten numerals in a line and sixty lines, or twenty numerals in a line and thirty lines. Also, the sheet might be printed with two choices on two hundred and forty lines, or three choices on two hundred and ten lines, etc., as will be understood. This increases the usefulness of the apparatus and makes possible the use of matching questions and choices up to ten or twenty. This is very desirable in connection with examinations in science and mathematics, and may also be used as well in history, literature, and other subject matter fields.

A further use of the apparatus may be had for indicating the right answer to a question when the student's paper shows the wrong answer, by pressing through the check sheet, those weights which are standing on the check sheet and which have not passed through because the answers punched by the pupil in the wrong place. The small hole thus made by the weight will indicate to the pupil the right answer to the questions that he missed.

If a student punches out the numeral to indicate a choice of answer and then changes his mind and punches out another numeral, it will be seen that it gives him two chances to be correct. Whereas, it is necessary that the student make one definite choice, the error may be corrected by the teacher or pupil placing a small gummed sticker over the error and thus preventing the weight from falling through on the scale pan.

While the machine is illustrated as operable by a foot pedal, the same may be motor driven in place thereof, and the table slid by motor driven means also.

By means of interchangeable scale charts for different tests and quizzes for which norms have been established the charts may, by means of the scale indicator, compute the percentage of correct answers.

In the same manner, the scoring apparatus will also register the raw scores transformed into any type of derived scores, such as grade position scores, equivalent age scores, percentile scores, the McCall T scores, C scores, G scores, intelligence quotient scores, achievement quotient scores, educational age scores, mental grade position scores, mental age scores and any other derived scores for which a score scale has been devised.

This result is brought about by having the computing charts of the computing mechanism interchangeable, so that when it is desired to transform a raw score reading from any test into any form of derived scores, it is only necessary to insert an interchangeable chart bearing the scale of the derived scores into which it is desirable to transform the raw scores. In this connection, any suitable means will be employed for detachably securing the interchangeable computing charts in place while the papers are being graded.

From the apparatus the derived score, as well as the raw score may, with the one operation, enable the operator to register both the raw score and the derived score.

For tests for which norms have not been established by interchangeable charts, it is possible to assign grades on the basis of a normal distribution of grades.

What I claim is:

1. In a scoring apparatus of that type including a computing mechanism and a vertically movable master plate having parallel rows of spaced openings, assemblies of like form each for mounting in a selected opening of and depending from the master plate, each assembly including an upstanding cylinder, a controlling element for operating the computing mechanism freely slidably mounted in and depending from said cylinder, a pilot correlating with and encompassing a portion of said controlling element, said pilot being slidably mounted in and depending from said cylinder, and a controlling element within said cylinder for said pilot.

2. In a scoring apparatus for the purpose set forth, a student's check sheet provided with columns of spaced horizontally aligned rows of spaced digits for each sheet selective punching, a carrier for and upon which said sheet is mounted, means for detachably connecting one end of the sheet to one end of the carrier, and said carrier being formed with openings corresponding in number to the number of the digits, said connecting means provided for each opening being concentrically aligned with a digit to permit of the punching out of the latter.

3. In a scoring apparatus, a master plate provided with spaced columns of spaced parallel rows of spaced openings, a spring controlled vertically movable supporting frame for said plate, pilot and controlling element assemblies mounted in selected openings of said plate and suspended therefrom, and a locking plate detachably connected to said assemblies and for maintaining the assemblies in the master plate.

4. In a scoring apparatus, a master plate provided with spaced columns of spaced parallel rows of spaced openings, a spring controlled vertically movable supporting frame for said plate, pilot and controlling element assemblies mounted in selected openings of said plate and suspended therefrom, and a locking plate detachably connected to said assemblies for maintaining the assemblies in the master plate, said locking plate disposed in superimposed relation with respect to said assemblies.

5. In a scoring apparatus of that type including a computing mechanism, a master plate provided with openings, a spring controlled vertically movable supporting frame for said plate, assemblies of like form mounted in selected openings of said plate and depending therefrom, each assembly consisting of a slidable freely vertically movable controlling element adapted to operate said mechanism, and a spring controlled vertically movable pilot encompassing a portion of said element for correlation with said element to prevent the retardation of the latter when moving downward with said pilot to operate said mechanism.

6. In a scoring apparatus of that type including a computing mechanism, a master plate provided with openings, a spring controlled vertically movable supporting frame for said plate, assemblies of like form mounted in selected openings of said plate and depending therefrom, each assembly consisting of a slidable freely vertically movable controlling element adapted to operate said mechanism, and a spring controlled vertically movable pilot encompassing a portion of said element and for correlation with said element to prevent the retardation of the latter when moving downward with said pilot to operate said mechanism, and a locking plate for said assemblies detachably connected to said master plate, disposed in superimposed relation with respect to said assemblies and provided with openings for the upward movement of said controlling elements as the master plate moves downward.

7. In a scoring apparatus of that type including a computing mechanism, a master plate provided with openings, a spring controlled vertically movable supporting frame for said plate, assemblies of like form mounted in selected openings of said plate and depending therefrom, each assembly consisting of a slidable freely vertically movable controlling element adapted to operate said mechanism, and a spring controlled vertically movable pilot encompassing a portion of said element for correlation with said element to prevent the retardation of the latter when moving downward with said pilot to operate said mechanism, a locking plate for said assemblies detachably connected to said master plate, disposed in superimposed relation with respect to said assemblies and provided with openings for the upward movement of said controlling elements as the master plate moves downwward, and each of said assemblies provided with means for suspending it from the master plate.

8. In a scoring apparatus, a master plate provided with spaced columns of spaced parallel rows of spaced openings, a spring controlled vertically movable supporting frame for said plate, pilot and controlling element assemblies mounted in selected openings of said plate and suspended therefrom, a locking plate detachably connected to said assemblies for maintaining the assemblies in the master plate, and a stripper plate for a student's check sheet, said stripper plate being arranged below said master plate and provided with openings for the passage therein and for the passage therethrough respectively of the pilot and the controlling element of an assembly.

9. In a scoring apparatus for the purpose set forth, a master plate provided with openings, a pilot and controlling element assembly mounted in each of said openings and suspended from said plate, a retaining element for said assemblies disposed in superposed relation with respect to the latter, and means for detachably clamping said element to said plate.

10. In a scoring apparatus for the purpose set forth, an oppositely shiftable slide provided with spaced pockets each adapted to receive a student's check sheet, a support for said slide, a pair of spaced guides for said slide fixed to said support, and spaced stops secured to the support for limiting the extent of the shifting of the slide in opposite directions.

11. In a scoring apparatus for the purpose set forth, an oppositely shiftable slide provided with spaced pockets each adapted to receive a student's check sheet, a support for said slide, a pair of spaced guides for said slide fixed to said support, spaced stops secured to the support for limiting the extent of the shifting of the slide in opposite directions, spaced means carried by said slide and each adapted when operated to lift a portion of a student's check sheet from the pocket in which it is arranged, and spaced members fixed to said support and each operating one of said spaced means at the extent of the shift of said slide in one direction.

12. In a scoring apparatus for the purpose set forth, a master plate provided with spaced openings, a spring controlled vertically movable supporting frame for said plate, means on said frame for detachably securing said plate therein, assemblies mounted in selected openings of said plate and having means for suspending them from said plate, each of said assemblies including a controlling element adapted for operating a computing mechanism, and a pilot encompassing a portion of the controlling element in acting to prevent the retardation of said element when moving in a direction to operate said computing mechanism, and a locking plate detachably connected to said assemblies for maintaining the assemblies in the master plate.

13. In a scoring apparatus for the purpose set forth, a master plate provided with spaced openings, a spring controlled vertically movable supporting frame for said plate, means on said frame for detachably securing said plate therein, assemblies mounted in selected openings of said plate and having means for suspending them from said plate, each of said assemblies including a controlling element adapted for operating a computing mechanism, and a pilot encompassing a portion of the controlling element in acting to prevent the retardation of said element when moving in a direction to operate said computing mechanism, a locking plate detachably connected to said assemblies for maintaining the assemblies in the master plate, the said elements being freely vertically movable and slidable relative to said pilots, said pilots being spring controlled and vertically movable, and said locking plate provided with openings for the passage of said elements when they move upward relative to said pilots.

14. In a scoring apparatus for the purpose set forth, a master plate provided with spaced openings, a spring controlled vertically movable supporting frame for said plate, means on said frame for detachably securing said plate therein, assemblies mounted in selected openings of said plate and having means for suspending them from said plate, each of said assemblies including a controlling element adapted for operating a computing mechanism, and a pilot encompassing a portion of the controlling element in acting to prevent the retardation of said element when moving in a direction to operate said computing mechanism, a locking plate detachably connected to said assemblies for maintaining the assemblies in the master plate, the said elements being freely vertically movable and slidable relative to said pilots, said pilots being spring controlled and vertically movable, said locking plate provided with openings for the passage of said elements when they move upward relative to said pilots, and a stationary stripper means arranged for a student's check sheet arranged below said assemblies and provided with openings for the passage therein and the passage therethrough respectively of the pilots and controlling elements.

15. In a scoring apparatus for the purpose set forth, a master plate provided with spaced openings, a spring controlled vertically movable supporting frame for said plate, means on said frame for detachably securing said plate therein, assemblies mounted in selected openings of said plate and having means for suspending them from said plate, each of said assemblies including a controlling element adapted for operating a computing mechanism, and a pilot encompassing a portion of the controlling element in acting to prevent the retardation of said element when moving in a direction to operate said computing mechanism, a locking plate detachably connected to said assemblies for maintaining the assemblies in the master plate, the said elements being freely vertically movable and slidable relative to said pilots, said pilots being spring controlled and vertically movable, said locking plate provided with openings for the passage of said elements when they move upward relative to said pilots, a stationary stripper means arranged for a student's check sheet arranged below said assemblies and provided with openings for the passage therein and the passage therethrough respectively of the pilots and controlling elements, the said elements being freely vertically movable and slidable relative to said pilots, said pilots being spring controlled and vertically movable, and said locking plate provided with openings for the passage of said elements when they move upward relative to said pilots.

16. In a scoring apparatus for registering the percentage of correct answers of different value to objective test questions and the aggregate score of the percentage of correct answers, the combination of a master plate provided with parallel rows of spaced openings, a vertically movable spring controlled carriage including a frame for supporting and bodily carrying the plate with the carriage, operable means for registering the percentage of correct answers to the test questions and for indicating the value of the score for such percentage of answers, assemblies of said plate like form each for mounting in a selected opening of and depending therefrom, each assembly including a freely slidably mounted controlling element for operating said means when the carriage moves downward, and a slidable spring controlled pilot correlating with said controlled element and encompassing a portion of the latter.

17. In a scoring apparatus for registering the percentage of correct answers of different value to objective test questions and the aggregate score of the percentage of correct answers, the combination of a master plate provided with parallel rows of spaced openings, a vertically movable spring controlled carriage including a frame for supporting and bodily carrying the plate with the carriage, operable means for registering the percentage of correct answers to the test questions and for indicating the value of the score for such percentage of answers, assemblies of like form each for mounting in a selected opening of said plate and depending therefrom, each assembly including a freely slidably mounted controlling element for operating said means when the carriage moves downward, and a slidable spring controlled pilot correlating with and encompassing a portion of said controlling element, a locking plate for said assemblies and disposed in superimposed relation to said assemblies, and means for connecting said plates together in superposed relation.

18. In a scoring apparatus for registering the percentage of correct answers to the whole number of questions from any number of questions with a predetermined unit interval, the combination of a master plate provided with parallel rows of spaced openings, a vertically movable spring-controlled carriage including a frame for supporting and bodily carrying the plate with the carriage, operable means for registering the percentage of correct answers to the test questions and for indicating the value of the score for such percentage of answers, assemblies of like form each for mounting in a selected opening of said plate and depending therefrom, each assembly including a freely slidable mounted controlling element for operating said means when the carriage moves downward, and a slidable spring-controlled pilot correlating with said controlling element and encompassing a portion of the latter, a locking plate for said assemblies disposed in superimposed relation to said assemblies, means for connecting said plates together in superposed relation, an apertured check sheet correlating with said pilots and elements for controlling the operation of said elements relative to said means, and a stripper plate for said check sheet arranged over the latter and having openings for the passage therethrough of said pilots and elements for correlation with said check sheet.

19. In a scoring apparatus for registering the percentage of correct answers to the whole number of questions from any number of questions with a predetermined unit interval, the combination of a master plate provided with parallel rows of spaced openings, a vertically movable spring-controlled carriage including a frame for supporting and bodily carrying the plate with the carriage, operable means for registering the percentage of correct answers to the test questions and for indicating the value of the score for such percentage of answers, assemblies of like form each for mounting in a selected opening of said plate and depending therefrom, each assembly including a freely slidably mounted controlling element for operating said means when the carriage moves downward, and a slidable spring-controlled pilot correlating with said controlling element and encompassing a portion of the latter, a locking plate for said assemblies disposed in superimposed relation to said assemblies, means for connecting said plates together in superposed relation, an apertured check sheet correlating with said pilots and elements for controlling the operation of said elements relative to said means, and a stripper for said check sheet arranged over the latter and having openings for the passage therethrough of said pilots and elements for correlation with said check sheet, certain of said controlling elements being of uniform weight, others of said controlling elements progressively increasing in weight.

20. In a scoring apparatus for registering a total score when weighted measures are used to indicate value given to the several questions propounded in an examination, a master plate provided with a plurality of openings, means supporting said master sheet for vertical movement, a check sheet for disposing below said plate and formed with indicia for alignment with said openings, a supporting sheet for said check sheet formed with openings corresponding in number to the openings in said plate, a computing scale below said supporting sheet, a plurality of weights, and means slidingly supporting said weights from said master plate, said supporting means including tubular pilot means movable relative to said plate and to said weights whereby the frayed edges of the openings formed in said check sheet will not retard the free downward movement of said weights to a position contacting with said computing scale.

21. In a scoring apparatus for registering a total score when weighted elements are used to indicate value given to the several questions propounded in an examination, a vertically movable weight carrier, weight elements carried by said carrier, individual guide means for each element depending below said carrier, a check sheet for removably disposing below said elements and adapted to have openings punched therethrough to receive said guide means and permit said elements to extend below said sheet, and a computing scale below said sheet for determining the weight of the elements extending through and below said sheet.

22. In a scoring apparatus for registering a total score when weighted elements are used to indicate value given to the several questions propounded in an examination, a vertically movable weight carrier, weight elements carried by said carrier, individual guide means for each element depending below said carrier, means supporting said guide means for movement relative to said carrier, a check sheet for removably disposing below said elements and adapted to have openings punched therethrough to receive said guide means and permit said elements to extend below said sheet, and a computing scale below said sheet for determining the weight of the elements extending through and below said sheet.

FLOYD B. LEE